(12) United States Patent
Dror et al.

(10) Patent No.: US 9,276,851 B1
(45) Date of Patent: Mar. 1, 2016

(54) PARSER AND MODIFIER FOR PROCESSING NETWORK PACKETS

(71) Applicant: Marvell Israel (M.I.S.L) Ltd., Yokneam (IL)

(72) Inventors: Nitzan Dror, Tel Aviv (IL); Alexander Martfeld, Netanya (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 283 days.

(21) Appl. No.: 13/722,483

(22) Filed: Dec. 20, 2012

Related U.S. Application Data

(60) Provisional application No. 61/578,203, filed on Dec. 20, 2011, provisional application No. 61/606,943, filed on Mar. 5, 2012.

(51) Int. Cl.
*H04L 12/741* (2013.01)

(52) U.S. Cl.
CPC .................................. *H04L 45/745* (2013.01)

(58) Field of Classification Search
None
See application file for complete search history.

(56) References Cited

U.S. PATENT DOCUMENTS

| | | | |
|---|---|---|---|
| 6,304,903 B1 | 10/2001 | Ward | |
| 6,356,951 B1 * | 3/2002 | Gentry, Jr. | 709/250 |
| 6,611,524 B2 | 8/2003 | Devanagondi et al. | |
| 6,741,591 B1 | 5/2004 | Kaldani et al. | |
| 6,904,057 B2 | 6/2005 | Sarkinen et al. | |
| 6,970,462 B1 | 11/2005 | McRae | |
| 7,042,848 B2 | 5/2006 | Santiago et al. | |
| 7,046,687 B1 | 5/2006 | Brown et al. | |
| 7,133,400 B1 | 11/2006 | Henderson et al. | |
| 7,187,694 B1 * | 3/2007 | Liao | 370/474 |
| 7,212,531 B1 | 5/2007 | Kopelman et al. | |
| 7,233,597 B2 | 6/2007 | Kumar et al. | |
| 7,289,498 B2 | 10/2007 | Yu et al. | |
| 7,356,033 B2 | 4/2008 | Basu et al. | |
| 7,426,608 B1 | 9/2008 | Kao | |
| 7,433,357 B2 | 10/2008 | Oh et al. | |
| 7,702,899 B2 | 4/2010 | Kobozev et al. | |
| 7,978,700 B2 | 7/2011 | Kopelman et al. | |
| 8,358,655 B2 | 1/2013 | Wang et al. | |
| 8,611,352 B2 | 12/2013 | Mizrahi et al. | |
| 8,638,793 B1 | 1/2014 | Ben-Mayor et al. | |
| 2004/0066748 A1 | 4/2004 | Burnett | |
| 2004/0165613 A1 * | 8/2004 | Kim | H04L 49/90 370/463 |
| 2005/0044252 A1 | 2/2005 | Floyd et al. | |
| 2006/0271823 A1 * | 11/2006 | Smith | 714/37 |
| 2008/0225874 A1 | 9/2008 | Lee | |
| 2009/0092136 A1 | 4/2009 | Nazareth et al. | |

* cited by examiner

*Primary Examiner* — Diane Lo

(57) ABSTRACT

In a method of processing a packet header received via an input interface, a plurality of data units that collectively correspond to a header of a network packet is received. A location of a target field of the header in one or more data units among the plurality of data units is specified, and the one or more data units containing the target field are identified among the plurality of data units. The target field is processed using a local offset corresponding to the specified location of the target field in the identified one or more data units, without simultaneously storing all data units of the plurality of data units in a buffer.

23 Claims, 6 Drawing Sheets

PARSER AND MODIFIER FOR PROCESSING NETWORK PACKETS

CROSS-REFERENCE TO RELATED APPLICATION

This disclosure claims the benefit of U.S. Provisional Patent Application No. 61/578,203, entitled "Parser and Modifier for Processing Network Packets" and filed on Dec. 20, 2011, and U.S. Provisional Patent Application No. 61/606,943, entitled "Generic Parser and Modifier" and filed on Mar. 5, 2012, the disclosures of which are hereby incorporated by reference herein in their entireties.

FIELD OF TECHNOLOGY

The present disclosure relates generally to communication networks and, more particularly, to packet-based communication networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many packet-based communication networks include various devices, such as bridges, routers, etc., that operate on packets according to information contained in headers of the packets. Digital hardware within these devices typically processes various fields within the packet headers in order to perform different functions. To this end, certain basic processing operations are commonly performed, such as parsing a particular field of a packet header (e.g., identifying and extracting the field so that it may be sent elsewhere for further processing), and/or modifying the field by replacing one or more bits or bytes of the field with new values. As one of many possible examples, a packet processing unit within a router device may parse a destination medium access control (MAC) address field of a packet header, and send the destination MAC address to another processing unit within the router for further processing (e.g., to compare the destination MAC address with the MAC address of the router). As another example, a packet processing unit within a router may modify a source MAC address field of a packet header by setting the field value to the MAC address of the router before forwarding the packet to another device.

Typically, small interface widths (e.g., wire, trace, or pin counts) are desirable between different packet processing units within a device, or between packet processing units of multiple devices, in order to satisfy cost and size constraints. Packet header sizes, however, have tended to increase over time due to advances in technology. As a result, packet headers are commonly sent over interfaces that are narrower than the header size, requiring that the packet header be sent over the course of multiple transactions or clock cycles. For example, a 64 byte interface may require three transactions to receive an entire 190 byte header (i.e., in successive header portions of 64 bytes, 64 bytes, and 62 bytes). Parsing or modifying header fields in such cases has traditionally been accomplished by accumulating the header portions in registers until the entire packet header has been received, at which point the desired processing operation is performed. This approach, however, generally suffers from various drawbacks. For example, the accumulation of the header portions typically requires a significant amount of storage area (e.g., a large number of flip-flop cells) in order to store the entire header, and introduces a packet transmission latency that can be substantial for larger header sizes sent over a larger numbers of transactions. Moreover, the traditional approach can require complex circuitry occupying a large area, with the design of much of the circuitry being highly dependent on the maximum header size.

SUMMARY

In an embodiment, a method of processing a packet header received via an input interface includes receiving, at a processing unit within a network device, a plurality of data units that collectively correspond to a header of a network packet, specifying, at the processing unit, a location of a target field of the header in one or more data units among the plurality of data units, and identifying the one or more data units containing the target field among the plurality of data units. The method also includes processing, at the processing unit, the target field using a local offset corresponding to the specified location of the target field in the identified one or more data units, without simultaneously storing all data units of the plurality of data units in a buffer.

In another embodiment, an apparatus includes an input interface, a state machine module, and a field processing module. The input interface is configured to receive a plurality of data units that collectively correspond to a header of a network packet. The state machine module is configured to specify a location of a target field of the header in one or more data units among the plurality of data units, and identify the one or more data units containing the target field among the plurality of data units. The field processing module hays one or more inputs coupled to the input interface, and is configured to process the target field using a local offset corresponding to the specified location of the target field in the identified one or more data units, without simultaneously storing all data units of the plurality of data units in a buffer.

In another embodiment, a method of processing a packet header includes receiving, at a processing unit of a network device, information indicating a global offset G. The global offset G is an expected starting location of a target field of a header of a network packet relative to a beginning of the header. The method also includes specifying, at the processing unit and based on the global offset G and an interface width W of an input interface, (i) a transaction number N corresponding to a target transaction in which at least an initial portion of the target field is expected to be received, and (ii) a local offset L. The local offset L is a starting location of the target field relative to a portion of the header expected to be received in the target transaction. The method also includes detecting, at the processing unit, each transaction of a plurality of transactions in which a new portion of the header is received via the input interface, and, in response to detecting the Nth transaction of the plurality of transactions, processing, at the processing unit, the target field using the specified local offset L.

In another embodiment, an apparatus includes an input interface having an interface width W, a state machine module, and a field processing module. The state machine module is configured to receive information indicating a global offset G. The global offset G is an expected starting location of a target field of a header of a network packet relative to a beginning of the header. The state machine module is also configured to specify, based on the global offset G and the interface width W, (i) a transaction number N corresponding to a target transaction in which at least an initial portion of the target field is expected to be received, and (ii) a local offset L, wherein the local offset L is a starting location of the target field relative to a portion of the header expected to be received in the target transaction. The state machine module is also configured to detect each transaction of a plurality of transactions in which a new portion of the header is received via the input interface. The field processing module has one or more inputs coupled to the input interface, and is configured to process the target field using the specified local offset L in response to the state machine module detecting the Nth transaction of the plurality of transactions.

DETAILED DESCRIPTION

In embodiments described below, a packet processing unit within a bridge, router, or other network device is configured to receive at least the headers of packets over the parallel data lines of an input interface. For ease of explanation, the terms "header" and "packet header" may be used herein to refer to a header of a packet, a footer of a packet, a midamble of a packet, or a packet descriptor (or other suitable data unit representing the header, footer or midamble) associated with a packet. At least in some instances, the input interface receives a packet header in a piecemeal fashion, with each piece, or "data unit," of the packet header being received during a different one of multiple transactions or clock cycles (e.g., receives a packet header having a bit or byte length greater than the bit or byte width of the input interface). In an embodiment, the packet processing unit receives information indicating the starting position of a particular header field to be modified and/or parsed (e.g., information specifying a number between 0 and M−1 for a packet header containing a total of M bytes). In order to identify the target field based on this "global" field location information—without using memory and other circuitry to accumulate the entire packet header—the packet processing unit calculates "local" field location information that is specific to the packet processing unit receiving the packet header, and, in particular, is specific to the width of the interface on which the packet header is to be received. In an embodiment, the local field location information includes the number of the transaction in which at least a beginning portion of the target field is expected to be received, and the location of the target field within the header portion expected to be received in that transaction (e.g., an offset between 0 and L−1 bytes, for an embodiment in which one header portion containing L bytes is received per transaction).

Once the transaction number, and field offset, corresponding to the target field are determined, the packet processing unit can identify the target field within the received portions of the packet header. In one embodiment, for example, the target field is identified within the received packet header by incrementing a counter each time a portion of the packet header is received, and then, when the counter reaches the determined transaction number, utilizing the determined field offset to locate the target field within the header portion that is received in the corresponding transaction. In other embodiments and/or scenarios, and as described in further detail below, the target field is divided across multiple transactions, and/or more than one field of a single packet header is targeted for modification and/or parsing.

Figure 1:
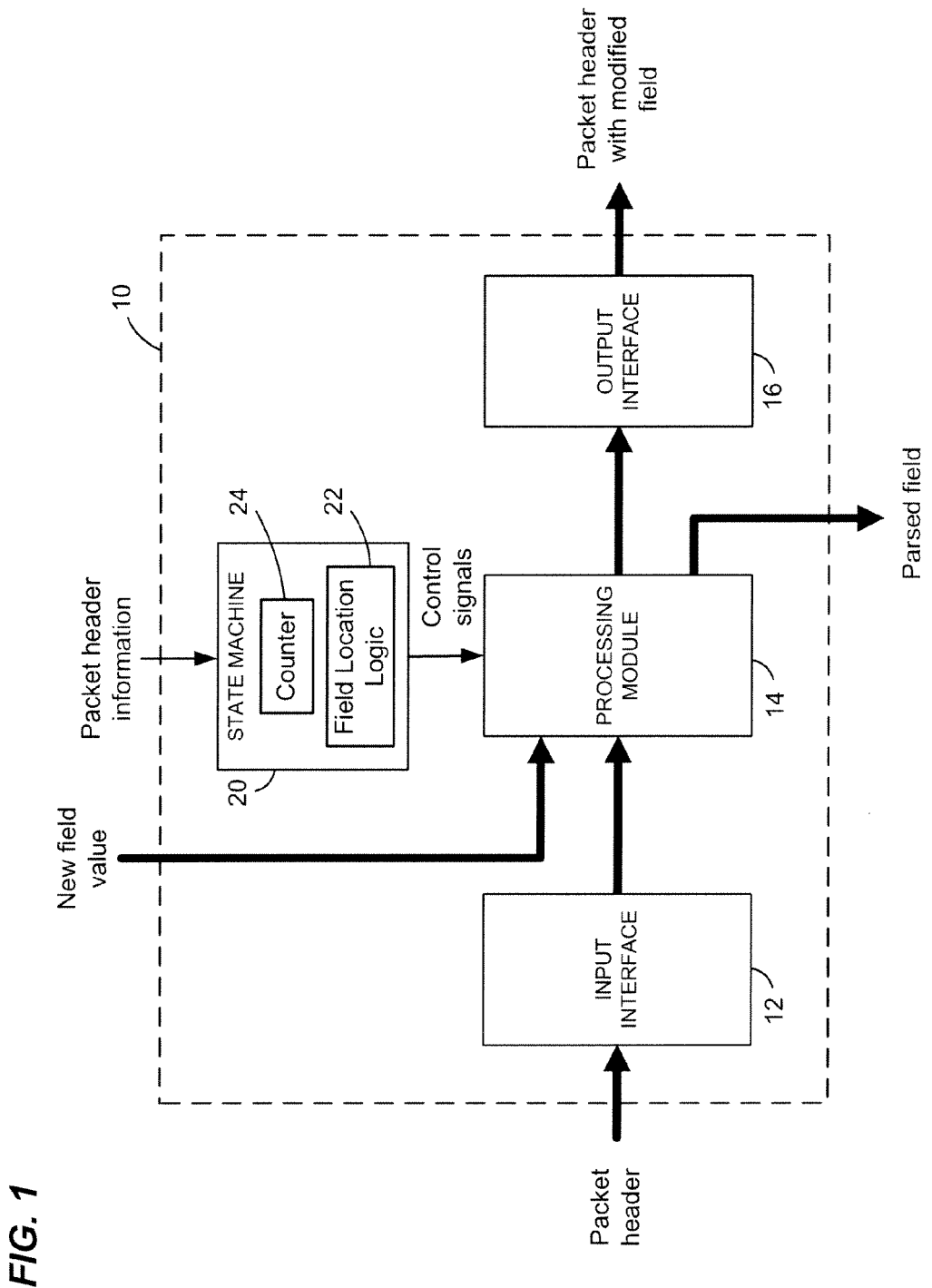
FIG. 1 is a block diagram of an example packet processing unit that utilizes packet processing techniques of the present disclosure, according to an embodiment.

FIG. 1 is a block diagram of an example packet processing unit 10 that utilizes packet processing techniques of the present disclosure, according to an embodiment. In one embodiment, the packet processing unit 10 is included within a network device, such as a network switch (e.g., bridge, router, etc.). For example, the packet processing unit 10 is one of multiple packet processing units within the network device (e.g., one of multiple packet processing units implemented in hardware and arranged in a pipeline architecture, or other suitable processing architecture, within the network device), in an embodiment.

In the example embodiment of FIG. 1, the packet processing unit 10 includes an input interface 12, a field processing module 14 coupled to the output of the input interface 12, an output interface 16 coupled to the output of the field processing module 14, and a state machine module 20. Below, the general structure and function of each module is described, followed by a more detailed description of the operation of the modules when the packet processing unit 10 receives a packet header containing a field targeted for modification and/or parsing. Specific examples that correspond to different locations of a target field within a packet header are provided with reference to FIGS. 2 and 3.

The input interface 12 includes a number of parallel elements configured to receive blocks of parallelized data. For example, the input interface 12 includes a parallel arrangement of multiple integrated circuit pins, multiple conductive traces or wires, and/or multiple active stages such as amplifiers and/or filters, in various embodiments. In some embodiments, the input interface 12 includes only passive components (e.g., only conductive wires, pins, or traces). In an embodiment, the number of parallel elements for receiving data (the interface "width") is fixed. For example, in one embodiment where the input interface 12 includes a set of 512 pins for receiving data, the input interface 12 has a fixed width of 512 bits (64 bytes). In addition to the parallel elements corresponding to the interface width, the input interface 12 includes one or more paths for control data, in an embodiment. In other embodiments, the input interface 12 does not include any paths for control data.

The field processing module 14 receives successive data units (blocks of parallel data) from the parallel elements of the input interface 12, in an embodiment, and operates on each data unit to generate one or more outputs according to control signals received from the state machine module 20. In particular, in one embodiment, the field processing module 14 includes one or more multiplexors that operate on (multiplex) each data unit to generate the one or more outputs according to the control signals received from the state machine module 20. In the example processing unit 10, the field processing module 14 processes each data unit from the input interface 12 by multiplexing the data unit to produce two outputs. A first output passes each data unit received by the field processing module 14 through to the output interface 16, with a portion of the data being modified, or not modified, according to the state of the control signals from the state machine module 20. A second output provides a parsed/extracted portion of a data unit received by the field processing module 14 to an external unit or device (not seen in FIG. 1). In an embodiment, the control signals from the state machine 20 determine whether the field processing module 14 parses any portion of a particular data unit, and/or which portion of the data unit is parsed.

The output interface 16 is similar to the input interface 12, in an embodiment. In one embodiment, the output interface 16 has the same bit/byte width as the input interface 12. Upon receiving each modified or unmodified data unit from the field processing module 14, the output interface 16 passes the data through to the next device or unit (subject to any amplification, filtering, etc., included in the output interface 16), such as a next packet processing unit in a pipeline, for example.

The state machine module 20 generally coordinates and controls the modification and parsing operations of the packet processing unit 10 by generating control signals, which are provided to the field processing module 14 as described above. More specifically, in an embodiment, the state machine module 20 determines whether parsing and/or modification operations should be implemented for each received data unit (e.g., determines the transactions or clock cycles in which such operations should occur), and determines which portion(s) within a received data unit, if any, should be modified and/or parsed.

The operation of the packet processing unit 10 will now be described for an embodiment and scenario in which each data unit received by the input interface 12 is a different portion of a packet header, where the packet header contains a field targeted for modification and/or parsing. In this embodiment and scenario, the size of the packet header received by the input interface 12 is larger than the width of the input interface 12, causing the packet header to be received in multiple portions (e.g., one per transaction, where each transaction corresponds to one or more clock cycles, in various embodiments). Moreover, the packet header received by the input interface 12 either includes, or does not include, a payload portion of the packet, in various embodiments and/or scenarios. In some embodiments, the packet processing unit 10 only receives packet headers of a single, fixed size, and/or packet headers including a target field of a single, fixed size. Moreover, in some embodiments where it may be desirable to process two or more target fields within a single packet header, multiple packet processing units similar to the packet processing unit 10 are arranged sequentially, with each packet processing unit being configured to identify and process (e.g., parse and/or modify) a different one of the target fields. In one such embodiment where multiple target fields have different field sizes, each of the sequential packet processing units is optimized to process a target field of a different size. For example, the shift registers, multiplexors and/or other circuitry in a particular packet processing unit are designed to have the minimum size sufficient to handle the target field to be processed by that packet processing unit.

In an embodiment, the state machine module 20 determines whether a packet header to be received includes a target field that should be modified and/or parsed. The target field, like each of the other fields of the packet header, includes control and/or other overhead information. For example, in various embodiments and/or scenarios, the target field is a medium access control (MAC) source address field, MAC destination address field, internet protocol (IP) destination address field, virtual local area network (VLAN) identifier field, packet length field, or other type of field. In one embodiment, the packet header is an Ethernet header, and the target field is a protocol-defined field of the Ethernet header.

The determination of whether the packet header includes a target field is made before, after, and/or simultaneously with receiving a beginning portion of the packet header, in various embodiments, and in some embodiments is made based on control information corresponding to the packet header that is received from one or more sources external to the packet processing unit 10. In one embodiment, the information from the external source(s) includes information specifying the location of the target field relative to the beginning of the entire packet header (i.e., "global" field location information). For example, in one embodiment where a packet header includes 240 bytes, the received information includes a number between 0 and 239 specifying an offset between the beginning of the packet header and the beginning of the target field. Further, in various embodiments, the received information additionally includes information indicating when a new packet header will be, or is being, received, information indicating whether and/or how a target field within the packet header should be processed (e.g., parsed, modified, both parsed and modified, or neither parsed nor modified), and/or other suitable information relating to the packet header. In an embodiment, the external source(s) include the device or unit from which the input interface 12 receives the packet header.

The state machine module 20 includes field location logic 22 which, in an embodiment, utilizes the received global field location information, in combination with the known width of the input interface 12, to calculate "local" field location information. In an embodiment, the local field location information includes both 1) the number of the transaction in which the header portion containing the target field (or a beginning portion of the target field) is expected to be received, and 2) the starting location/offset of the target field within that header portion (e.g., in an embodiment where the interface width, and therefore the maximum header portion size, is 64 bytes, a number between 0 and 63). In this manner, any external sources that provide global field location information to the packet processing unit 10 need not know, or account for, the width of the input interface 12, which helps to avoid compatibility or redesign issues when utilizing the packet processing unit 10. At the same time, and unlike past techniques, this approach allows the packet processing unit 10 to receive global field location information without requiring that the packet header be locally reassembled (using distribution circuitry, registers, etc.) in order to locate and operate on the target field.

Once the local field location information (e.g., transaction number, and target field offset within a header portion, in an embodiment) is determined, and assuming the state machine module 20 knows which transaction corresponds to the start of the entire packet header (e.g., based on an indicator from the external source(s)), the state machine module 20 can identify the target field within the packet header, regardless of which position the field occupies within the packet header. To identify the target field, in an embodiment, the state machine module 20 includes a counter 24 that is incremented for each transaction in which a new header portion is received by the input interface 12. In various embodiments, the counter 24 is incremented each time the state machine module 20 receives information from the external source(s) indicating a new data transaction, or according to a different suitable technique for detecting a new data transaction. When the counter 24 reaches a threshold corresponding to the transaction number determined by the field location logic 22, the state machine module 20 knows that the target field, or at least the beginning of the target field, is included in the corresponding transaction. For example, in one embodiment, the state machine module 20 resets the counter 24 to zero when detecting a new packet header, sets the threshold value equal to the transaction number determined by the field location logic 22, and increments the counter by one for each new transaction in which a portion of the packet header is received.

When the value of the counter 24 indicates that a current transaction does not correspond to the target field, the state machine module 20 provides control signals to the field processing module 14 that cause the field processing module 14 to pass the received header portion, unchanged, to the output interface 16, in an embodiment. When the value of the counter 24 indicates that the determined transaction number has been reached, however, the state machine module 20 provides control signals to the field processing module 14 that cause the field processing module 14 to modify and/or parse the target field. Information indicating how the target field should be processed (e.g., modified, parsed, or both modified and parsed), is received by the state machine module 20 from the external source(s), in an embodiment.

If the state machine module 20 receives data indicating that the target field should be modified, the state machine module 20 generates control signals that cause the field processing module 14 to replace the original value of the target field with a new field value, in an embodiment. In one embodiment, the field processing module 14 receives the new field value from the external source(s) as an additional input. The field processing module 14 then provides the packet header portion, including the now-modified target field, to the output interface 16, in an embodiment. If the state machine module 20 receives data indicating that the target field should be parsed, the state machine module 20 generates control signals that cause the field processing module 14 to extract the target field from the header portion. The packet processing unit 10 then sends the parsed target field to another packet processing unit and/or device, in an embodiment.

In some embodiments and/or scenarios, the target field is positioned within the packet header such that, when the packet header is broken into portions sized to fit within the interface width, the target field is divided between at least two header portions. In one embodiment, for example, a beginning portion of the target field is received in the transaction corresponding to the determined transaction number, and the remainder of the target field is received over the course of one or more subsequent transactions. In an embodiment, the state machine module 20 determines whether the target field is expected to occupy multiple header portions based on the local field location information (also determined by the state machine module 20), and based on the known size of the target field. The size of the target field is indicated by information received from the external source(s), or is known a priori by the state machine module 20, in various embodiments. In one embodiment where some or all received packet headers include target fields divided across multiple transactions, the packet processing unit 10 includes a memory (not seen in FIG. 1) having multiple memory locations for accumulating the portions of a target field, thereby allowing the complete, extracted target field to be reassembled during parsing.

In some embodiments that include memory for accumulating the target field portions, the memory is only large enough to store the target field. For example, in an embodiment where the packet processing unit 10 knows a priori that each target field will be only 2 bytes long (but may extend across two transactions), the memory includes only two, single-byte registers. Thus, the memory may be much smaller than a memory that would be required if using the conventional approach of accumulating the entire packet header. In one embodiment, the registers are only utilized for parsing a divided target field, and not for modifying a divided target field. For example, in an embodiment, the field processing module 14 provides the parsed portions of the target field to respective registers, after which the complete, parsed target field is reassembled and sent to its destination.

In some embodiments where the packet processing unit 10 modifies a target field, and where the target field is divided across multiple transactions, the packet processing unit 10 modifies only one portion of the target field per transaction. In one such embodiment, for example, the field processing module 14 receives only a corresponding portion of the new field value for each transaction that includes a part of the target field.

In alternative embodiments, the packet processing unit 10 is configured differently than seen in FIG. 1 and described above. In one alternative embodiment, for example, the field processing module 14 is only configured to parse target fields, or is only configured to modify target fields, but not both. In another alternative embodiment, the packet processing unit 10 is configured to modify and/or parse multiple, concatenated fields within a single packet header. In still other embodiments, the field processing module 14 is configured to perform processing operations other than modification and parsing.

The packet processing unit 10 provides an architecture/design that, in some embodiments, is easily adjustable to different interface widths and target field sizes. Conversely, conventional designs that accumulate the entire packet header prior to processing (e.g., modifying and/or parsing) a field may require, for instance, more complex circuitry that is highly dependent on interface width and target field size.

Figure 2:
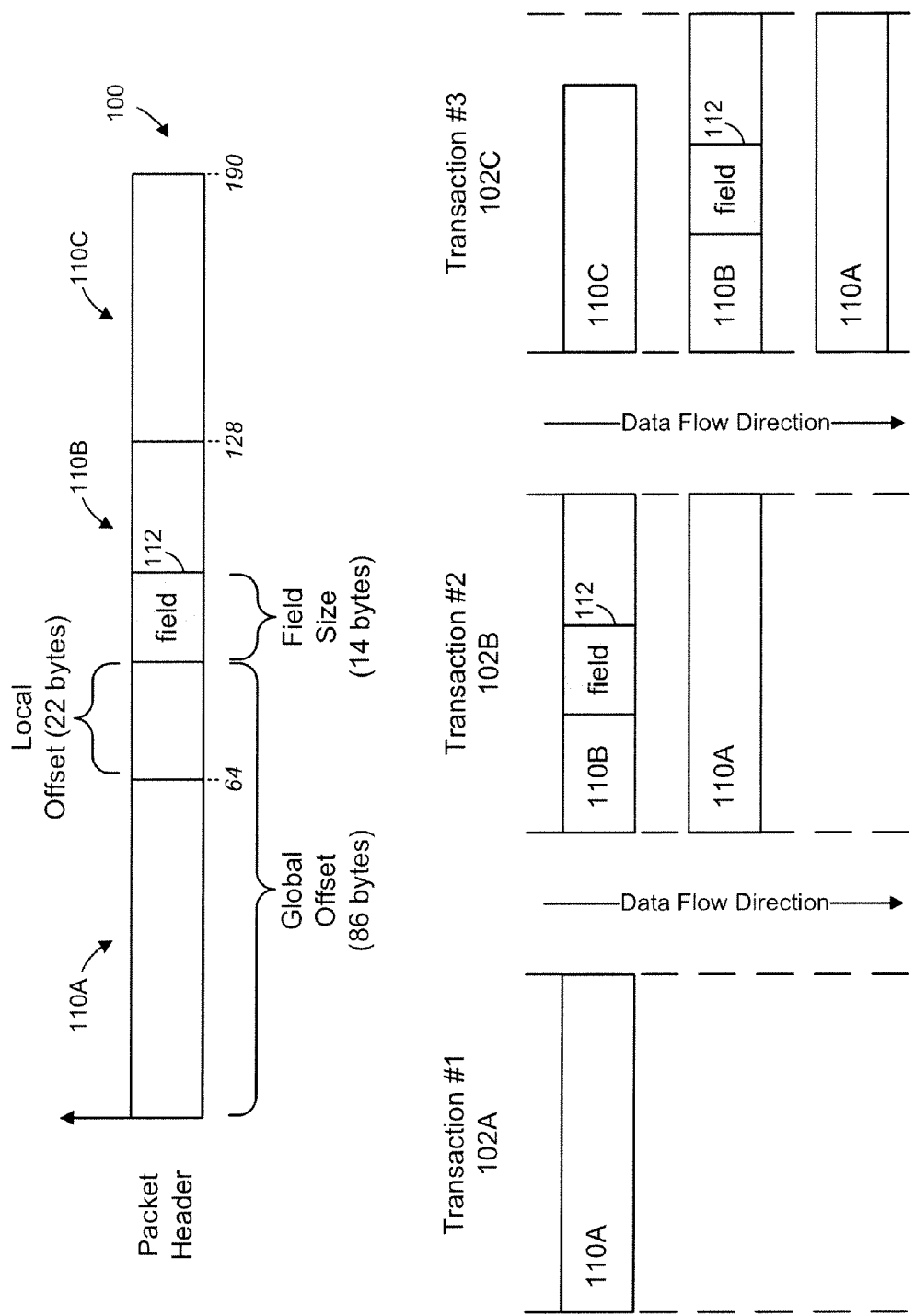
FIG. 2 is a diagram of an example packet header received over the course of multiple transactions, according to an embodiment.

FIG. 2 is a diagram of an example packet header 100 received over the course of multiple transactions, according to an embodiment. The packet header 100 is received by the input interface 12 of the packet processing unit 10 in FIG. 1, in an embodiment, and is described here with reference to FIG. 1. The packet header 100 includes a first (beginning) header portion 110A, a second (middle) header portion 110B, and a third (ending) header portion 110C, corresponding to the portions of the packet header 100 that are received by the input interface 12 in a first transaction 102A, a second transaction 102B, and a third transaction 102C, respectively. Each of the transactions 102A-102C corresponds to a different clock cycle, in an embodiment. In one embodiment, for example, each of the transactions 102A-102C corresponds to a different clock cycle in a sequence of three consecutive clock cycles. The "data flow direction" arrows seen in FIG. 2 represent the direction of movement of the header portions 110A-110C through a system or device, and the vertical positions seen in FIG. 2 represent locations of the header portions 110A-110C within the system or device during the respective one of the transactions 102A-102C. For example, header portion 110A is processed by the packet processing unit 10 during the first transaction 102A, processed by a second packet processing unit downstream from packet processing unit 10 during the second transaction 102B, and processed by a third packet processing unit downstream from the second packet processing unit during the third transaction 102C, in an embodiment.

In the example embodiment of FIG. 2, the input interface 12 has a width of 64 bytes and the packet header 100 is 190 bytes long, causing the beginning header portion 110A to be 64 bytes long, the middle header portion 110B to be 64 bytes long, and the ending header portion 110C to be 62 bytes long.

Moreover, the packet header 100 in the example embodiment of FIG. 2 includes a target field 112 (i.e., a field to be modified and/or parsed by the packet processing unit 10) in the middle header portion 110B.

As seen in the example embodiment and scenario of FIG. 2, the location of the beginning of the target field 112, with respect to the beginning of the entire packet header 100 (i.e., the "global offset" in FIG. 2), is the 87th byte, or byte number 86 if numbering the bytes of the packet header 100 from 0 to 189. The state machine module 20 receives information specifying this global location of the target field 112 from the external source(s) discussed above in connection with FIG. 1, in an embodiment. After the global location information is received, the field location logic 22 of state machine module 20 calculates local location information for the target field 112, including the number of the transaction within which the target field 112 will be received, and the offset of the target field 112 within the individual header portion. Thus, for the example packet 100, the field location logic 22 determines that the target field 112 will be received in the second transaction 102B (e.g., transaction #2 if the first transaction 102A is labeled transaction #1, in transaction #1 if the first transaction 102A is labeled transaction #0, etc.), and that the target field 112 is offset from the beginning of the second header portion 110B by 22 bytes.

Once the field location logic 22 determines that the target field 112 will be received in the second transaction 102B, the counter 24 can be utilized to determine when the header portion 110B corresponding to the second transaction 102B is received. When the counter 24 reaches the threshold indicating that the second header portion 110B is received, the state machine module 20 utilizes the local field offset (i.e., 22 bytes) to generate appropriate control signals that will cause the field processing module 14 to process (e.g., modify and/or parse) the target field 112.

Figure 3:
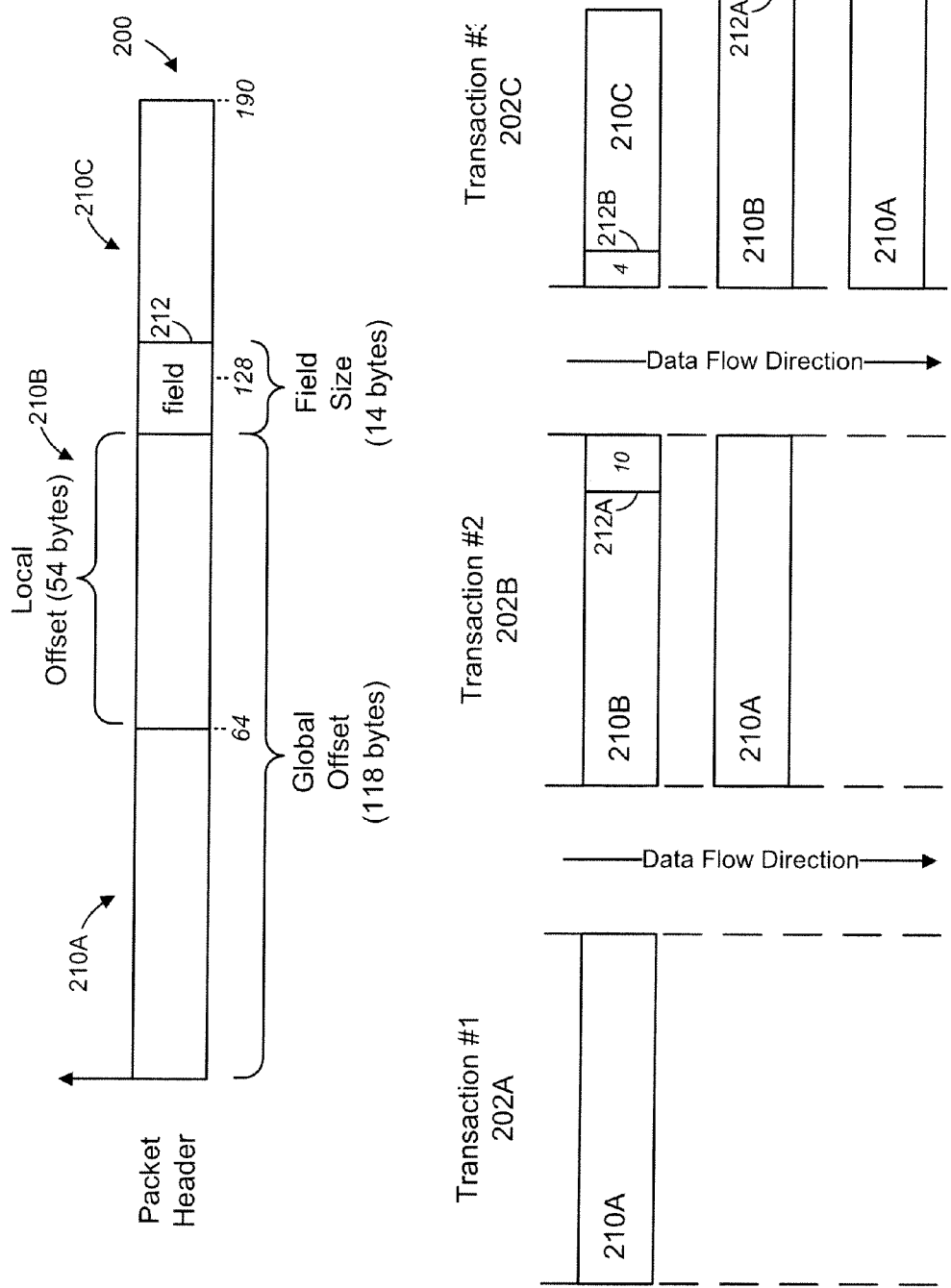
FIG. 3 is a diagram of another example packet header received over the course of multiple transactions, according to an embodiment.

As seen in FIG. 2, the local offset (22 bytes) and size (14 bytes) of the target field 112 cause the target field 112 to be entirely contained within a single transaction (i.e., the second transaction 102B). In other embodiments and/or scenarios, however, a packet header includes a target field that is divided between two or more portions of the packet header. FIG. 3 is a diagram of one such example packet header 200 received over the course of multiple transactions, according to an embodiment. The packet header 200 is received by the input interface 12 of the packet processing unit 10 in FIG. 1, in an embodiment, and is described here with reference to FIG. 1.

Similar to the packet header 100 of FIG. 2, the example packet header 200 includes a first (beginning) header portion 210A, a second (middle) header portion 210B, and a third (ending) header portion 210C, corresponding to the portions of the packet header 200 that are received by the input interface 12 in a first transaction 202A, a second transaction 202B, and a third transaction 202C, respectively. Also similar to the embodiment of FIG. 2, the input interface 12 has a width of 64 bytes and the packet header 200 is 190 bytes long, causing the beginning header portion 210A to be 64 bytes long, the middle header portion 210B to be 64 bytes long, and the ending header portion 210C to be 62 bytes long. In the packet header 200, however, a target field 212 extends across the boundary between the second header portion 210B and the third header portion 210C. More specifically, in this embodiment and scenario, the target field 212 includes a first target field portion 212A occupying the last 10 bytes of the second header portion 210B, and a second target field portion 212B occupying the first four bytes of the third header portion 210C.

As seen in the example embodiment and scenario of FIG. 3, the location of the beginning of the target field 212, with respect to the beginning of the entire packet header 200 (i.e., the "global offset" in FIG. 3), is the 119th byte, or byte number 118 if numbering the bytes of the packet header 200 from 0 to 189. The state machine module 20 receives information indicating this global location of the target field 212 from the external source(s) discussed above in connection with FIG. 1, in an embodiment. After the global location information is received, the field location logic 22 of state machine module 20 calculates local location information for the target field 212, including the number of the transaction within which the beginning of the target field 212 will be received, and the offset of the target field 212 within the individual header portion. Thus, for the example packet 200, the field location logic 22 determines that a first portion 212A of the target field 212 will be received in the second transaction 202B, and is offset from the beginning of the second header portion 210B by 54 bytes.

Once the field location logic 22 determines that the beginning portion 212A of the target field 212 will be received in the second transaction 202B, the counter 24 can be utilized to determine when the header portion 210B corresponding to the second transaction 202B is received. When the counter 24 reaches the threshold indicating that the second header portion 210B is received, the state machine module 20 utilizes the local field offset (i.e., 54 bytes) to generate appropriate control signals that cause the field processing module 14 to process (e.g., modify and/or parse) the first portion 212A of the target field 212 when the second header portion 210B is received. In some embodiments and/or scenarios in which the target field 212 is to be parsed, the state machine module 20 also generates control signals causing the parsed first portion 212A of the target field 212 to be stored in a buffer.

In one embodiment, the state machine module 20 determines, based on the length of the target field 212 (14 bytes), that the first four bytes of the third header portion 210C will correspond to the last four bytes of the target field 212. Based on this determination, in an embodiment, the state machine module 20 generates additional control signals that cause the field processing module 14 to process (e.g., modify and/or parse) the second portion 212B of the target field 212 when the third header portion 210C is received. In some embodiments and/or scenarios in which the target field 212 is to be parsed, the state machine module 20 generates control signals causing the parsed second portion 212B of the target field 212 to be stored in a buffer along with the (previously stored) parsed first portion 212A, such that the entire parsed target field 212 is available in storage.

While the example packet headers of FIGS. 2 and 3 have particular packet header sizes, target field sizes, and target field locations, and are received via 64 byte interfaces, the packet headers in other embodiments have other suitable sizes, have other target field sizes and/or locations, and/or are received by interfaces having widths smaller than or larger than 64 bytes. As a result, packet headers in some alternative embodiments and/or scenarios are received over the course of more than or fewer than three transactions.

Figure 4:
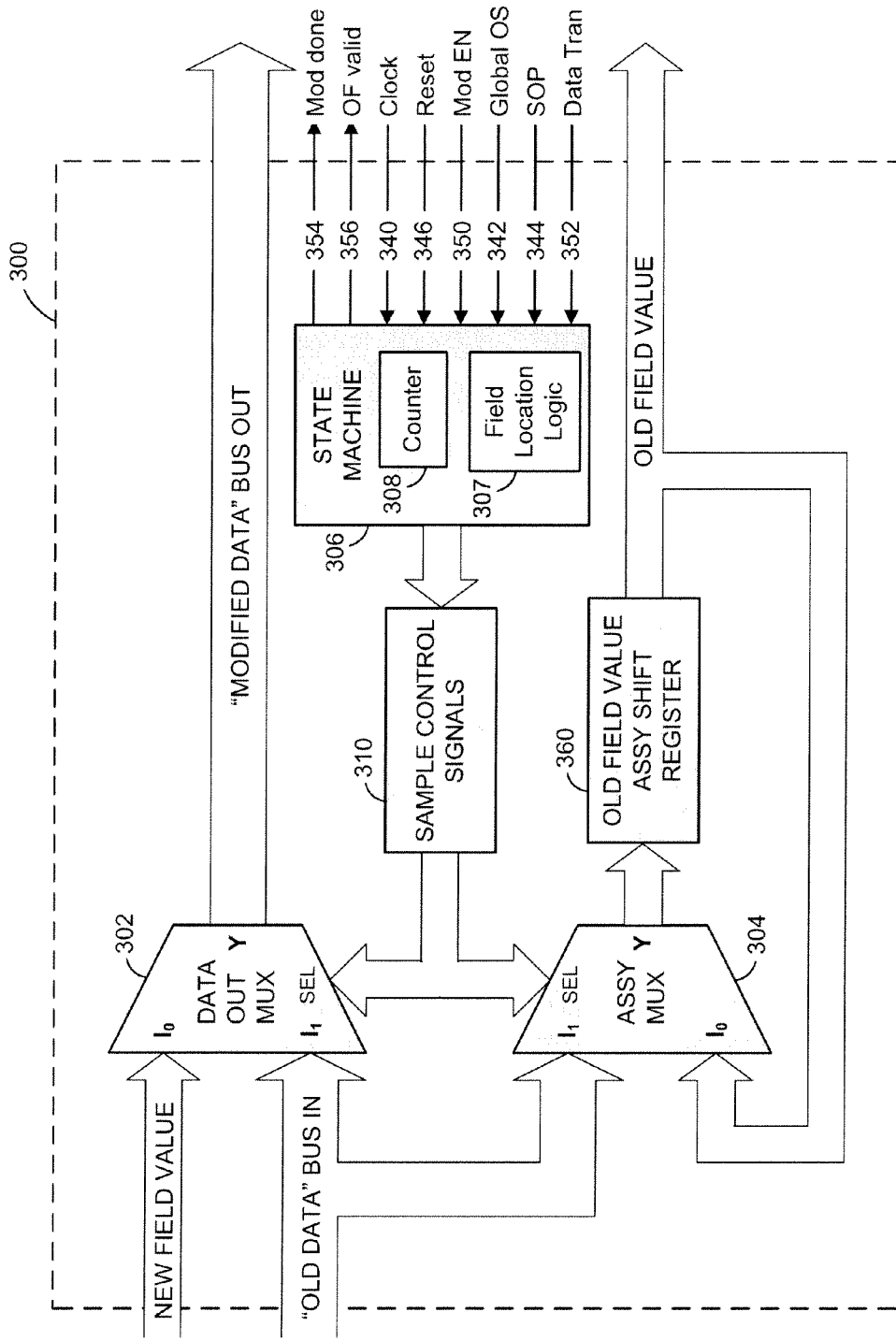
FIG. 4 is a block diagram of an example packet processing unit that utilizes modification and parsing techniques of the present disclosure, according to an embodiment.

FIG. 4 is a block diagram of another example packet processing unit 300, according to an embodiment. While the packet processing unit 300 may be similar to the packet processing unit 10 of FIG. 1, FIG. 4 depicts more detail with respect to one particular embodiment. The packet processing unit 300 includes a data out MUX 302 and an assembly MUX 304. In one embodiment, the data out MUX 302 and assembly MUX 304 are included within the field processing module 14 of FIG. 1, for example. The data out MUX 302 generally performs the modification and pass-through operations described above in connection with FIG. 1, and the assembly MUX 304 generally performs the parsing operations described above in connection with FIG. 1, in an embodiment. The data out MUX 302 and the assembly MUX 304 each include one or more multiplexors.

The packet processing unit 300 also includes a state machine module 306 having field location logic 307 and a counter 308, which are similar to the state machine module 20, field location logic 22, and counter 24 of FIG. 1, in an embodiment. The state machine module 306 provides control signals to the data out MUX 302 and the assembly MUX 304 via a control signal sampling module 310, in an embodiment. In one embodiment, for example, the control signal sampling module 310 includes one or more D flip-flops or other suitable data storage cells, which accept as inputs the multiple control signals generated by the state machine module 306. In an alternative embodiment, the control signal sampling module 310 is not included in the packet processing unit 300.

In the embodiment of FIG. 4, the state machine module 306 receives various signals from one or more sources external to the packet processing unit 300, such as the device or packet processing unit from which the packet processing unit 300 receives packet headers, for example. In addition to a clock signal 340 for maintaining the proper timing of the state machine module 306, the state machine module 306 receives a global offset value signal 342, a start of packet signal 344, a reset signal 346, a modify enable signal 350, and a data transaction signal 352. The global offset value signal 342 specifies a starting location of a target field within a packet header, as described above in connection with FIGS. 1-3, in an embodiment. The start of packet signal 344 indicates the beginning of a new packet, which interrupts any current action of the state machine module 306 and resets the counter 308 (e.g., to zero), in an embodiment. The reset signal 346 interrupts any current action of the state machine module 306, in an embodiment. For example, the reset signal 346 is utilized as a part of a system-wide reset capability, in an embodiment. The modify enable signal 350 indicates to the state machine module 306 whether a particular target field should be modified (e.g., as opposed to only parsing the target field, in an embodiment). Based on the modify enable signal 350, the state machine module 306 either causes the data out MUX 302 to replace a target field with the new field value, or to simply pass through the original field value. The data transaction signal 352 indicates to the state machine module 306 when a new portion of a packet header, corresponding to a new transaction, is being sent to the packet processing unit 300, in an embodiment. Thus, in one embodiment, the state machine module 306 increments the counter 308 each time that the data transaction signal 352 indicates a new transaction/header portion. In one embodiment, the global offset value signal 342 provides global target field location information, and the start of packet signal 344 provides an indicator of a new packet header, at least one clock cycle prior to the data transaction signal 352 providing an indication of the first transaction corresponding to the new packet header. Moreover, in one embodiment, the start of packet signal 344 provides an indicator of a new packet header during the final data transaction of the previous packet header, thereby allowing the packet headers to be processed back-to-back without an intervening gap or latency. In an embodiment, the timing of the various signals input to the state machine module 306 is designed such that the packet processing unit 300 can process incoming packet headers at wire speed, or substantially at wire speed.

In other embodiments, the state machine module 306 includes more or fewer signals from the external source(s). For example, in various embodiments, the state machine module 306 does not include the modify enable signal 350, or additionally includes a parse enable signal not seen in FIG. 4, etc.

The state machine module 306 also provides two output signals to destinations external to the packet processing unit 300, such as a destination of the modified packet headers and/or a destination of parsed target fields. In particular, in the example embodiment of FIG. 4, the state machine module 306 provides a "modify done" signal 354 indicating that a packet header portion provided on the output of the data out MUX 302 includes the modified target field, and an "old field valid" signal 356 indicating that a signal currently provided on the output of the assembly MUX 304 corresponds to the target field value of the packet header currently being processed (rather than, for example, a previously parsed value that is present on the assembly MUX 304 output due to the feedback arrangement of the assembly MUX 304). In other embodiments, the state machine module 306 instead provides more, or fewer, output signals to external destinations.

The packet processing unit 300 also includes a shift register 360 coupled to the output of the assembly MUX 304. In an embodiment, the shift register 360 stores each parsed portion of a target field, which allows the entire target field to be accumulated in scenarios where the target field is split across multiple transactions (e.g., as shown in the example scenario of FIG. 3). In one embodiment, the "old field valid" signal 356 is activated (e.g., set "high") by the state machine module 306 when the state machine module 306 determines that all portions of a target field have been accumulated in the shift register 360. In some embodiments (e.g., some embodiments where the target field is only one bit in length), the packet processing unit 300 does not include the shift register 360.

Figure 5:
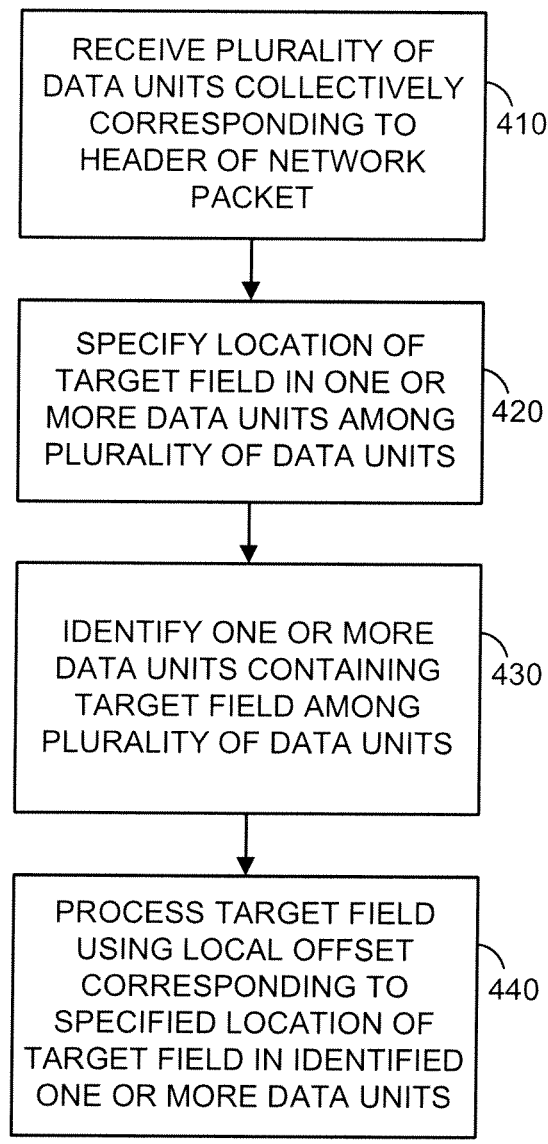
FIG. 5 is a flow diagram of an example method of processing a packet header, according to an embodiment.

FIG. 5 is a flow diagram of an example method 400 of processing a packet header, according to an embodiment. In an embodiment, the method 400 is implemented by a packet processing unit similar to the packet processing unit 10 of FIG. 1 or the packet processing unit 300 of FIG. 4. Moreover, in some embodiments and/or scenarios, the method 400 operates with respect to a packet header similar to the example packet header 100 of FIG. 2 or the example packet header 200 of FIG. 3. In an embodiment, the method 400 is repeated for each new packet header that is received.

At block 410, a plurality of data units is received. The plurality of data units collectively correspond to the header of a network packet. For example, each data unit of the plurality of data units is a different portion of the header, in an embodiment, with each data unit having the same length (except for a shorter last data unit, in scenarios where the header length is not an integer multiple of the interface width). In some embodiments, a different data unit of the plurality of data units is received in each transaction of a plurality of transactions (e.g., one per clock cycle).

At block 420, a location of a target field in one or more data units among the plurality of data units (received at block 410) is specified. Whether the target field is included in only one data unit or is included in multiple data units depends on whether the target field extends across a transaction boundary, as in the scenario of FIG. 3, for example. The target field location is specified at block 420 before at least some data units of the plurality of data units have yet been received at block 410, in an embodiment. In one embodiment, the target field location is specified at block 420 before any data units of the plurality of data units have yet been received at block 410.

In one embodiment, a transaction number and a local offset are specified at block 420. The transaction number corresponds to a "target" transaction, of the plurality of transactions, in which an initial data unit (beginning header portion) of the one or more data units containing the target field is expected to be received, in an embodiment. The local offset is a local starting location of the target field, i.e., the starting location relative to the initial data unit of the one or more data units containing the target field (e.g., a bit or byte offset from the first bit or byte position of the initial data unit), in an embodiment. In an embodiment, both the transaction number and the local offset are specified based on both a width of an input interface (i.e., the input interface via which the plurality of data units are received at block 410) and a global offset, where the global offset is an expected starting location of the target field relative to a beginning of the packet header (e.g., a bit or byte offset from the first bit or byte position of the entire header).

At block 430, the one or more data units containing the target field are identified from among the plurality of data units received at block 410. In an embodiment, the one or more data units containing the target field are identified based on a transaction number specified at block 420. For example, in an embodiment, identifying the one or more data units includes detecting each transaction in which a new data unit/header portion is received at block 410, incrementing a counter value in response to detecting each new transaction, and detecting when the counter value reaches a threshold value corresponding to the transaction number specified at block 420. In one embodiment, for example, the threshold value is set equal to the transaction number determined at block 420, and the counter value is incremented by one for each transaction in which a new data unit (portion of the packet header) is received.

At block 440, the target field of the packet header is processed (e.g., modified, parsed, or both) using a local offset corresponding to the location of the target field specified at block 420. The target field is processed at block 440 without having simultaneously stored/accumulated all data units of the plurality of data units received at block 410 (i.e., the entire packet header) in a buffer. In one embodiment, for example, accumulation of the entire header is not needed because the target field is processed during the transaction in which the target field is received, without waiting for the rest of the header to arrive. In one embodiment, where the target field may be split across multiple data units, only the bits of the parsed target field portions are stored/accumulated in a buffer, rather than the entire header. In an embodiment, the target field is processed at least in part by generating one or more control signals based on the local offset, and multiplexing the one or more data units containing the target field according to the generated control signal(s) (i.e., providing the one or more data units containing the target field to the inputs of one or more multiplexors, and operating on the inputs according to the multiplexor control signals). In one embodiment where the target field is modified, both the one or more data units containing the target field, and a corresponding one or more portions of a new value of the target field, are multiplexed to replace the old value of the target field with the new value.

In other embodiments, the method 400 includes additional blocks not seen in FIG. 5. In one embodiment, for example, the method 400 includes a block in which information indicating a global offset is received, where the global offset is used along with a known width of the input interface to specify a transaction number and local offset at block 420, as described above. Examples of these determinations are provided above in connection with FIGS. 2 and 3. In one embodiment, the method 400 also includes a block in which a total number of data units that contain the target field (e.g., one data unit, if the target field is not split across multiple transactions) is determined, based on the global offset, the known width of the input interface, and an expected size of the target field. Moreover, in one embodiment in which the processing at block 440 includes parsing of the target field, and in a scenario where it is determined that the target field is spread across two or more data units, the parsing of the target field at block 440 includes separately parsing the two or more portions of the target field as each portion is received. In one such embodiment, for example, a first parsed portion of the target field (extracted from the data unit that includes the start of the target field) is stored in a buffer during a first clock cycle, and a second parsed portion of the target field (extracted from the subsequent data unit that contains the rest of the target field) is stored in a buffer during a second clock cycle (e.g., the clock cycle immediately following the first clock cycle). After both parsed portions of the target field have been stored in a buffer, the method 400 concatenates (e.g., as a part of the processing at block 440) the portions to recreate the entire, parsed target field, in an embodiment.

Figure 6:
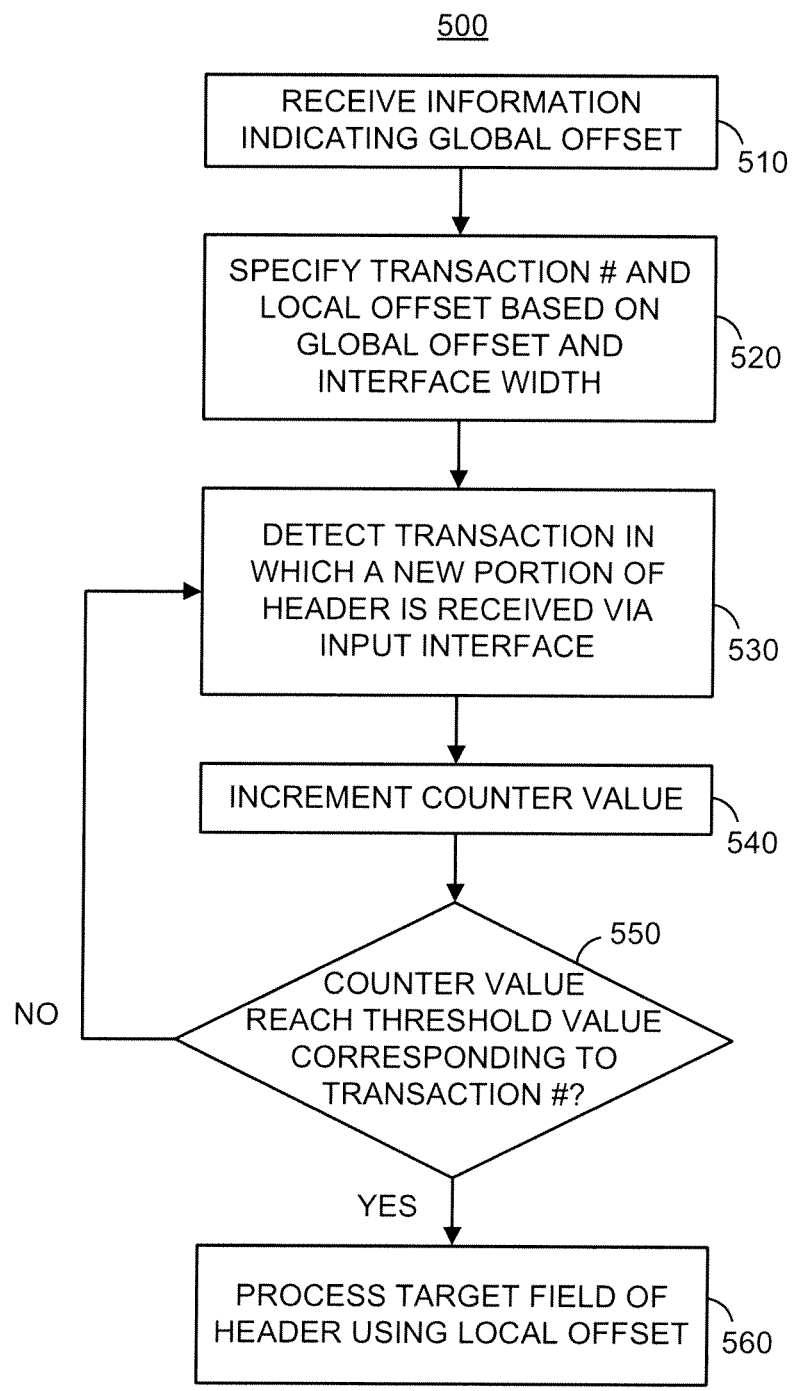
FIG. 6 is a flow diagram of another example method of processing a packet header, according to an embodiment.

Another FIG. 6 is a flow diagram of another example method 500 of processing a packet header. While the method 500 may be similar to the method 400 of FIG. 5, the method 500 describes more detail with respect to one particular embodiment. In an embodiment, the method 500 is implemented by a packet processing unit similar to the packet processing unit 10 of FIG. 1 or the packet processing unit 300 of FIG. 4. Moreover, in some embodiments and/or scenarios, the method 500 operates with respect to a packet header similar to the example packet header 100 of FIG. 2 or the example packet header 200 of FIG. 3. In an embodiment, the method 500 is repeated for each new packet header that is received.

At block 510, information indicating a global offset G is received. The global offset G is an expected starting location of a target field of a network packet header relative to the beginning of the header (e.g., for a packet header of size M, G is a value between 0 and M−1, in an embodiment).

At block 520, a transaction number N and a local offset L are specified, each based on both the global offset G and a known interface width W. The transaction number N corresponds to a "target" transaction in which at least the initial (beginning) portion of the target field is expected to be received, and the local offset L is a starting location of the target field relative to the header portion expected to be received in the target transaction. In an embodiment, the transaction number N is determined by setting N equal to the lowest integer that is equal to or greater than G÷W (i.e., setting N equal to G÷W, rounded up to the next closest integer if G÷W is not itself an integer), and the local offset L is determined by setting L equal to (G modulo W). Examples of these determinations are provided above in connection with FIGS. 2 and 3. For purposes of the above equation for the transaction number N, N is defined according to a convention in which the first transaction is viewed as transaction number one. It is understood, however, that the calculations actually performed by hardware and/or software may define a transaction number variable using a different convention, such as one in which the first transaction is viewed as transaction number zero. In one embodiment, for example, the equation described above for transaction number N is satisfied even though the actual calculations performed by hardware and/or software set a transaction number variable equal to G÷W rounded down, rather than up, to the next closest integer (if G÷W is not itself an integer).

In some embodiments, the global offset G and local offset L have values selected from a range of values having a resolution of one byte, in order to reduce the size of synthesized code (and thus, the corresponding area of digital hardware) relative to the case in which a one bit resolution is used. In other embodiments, the local offset G and local offset L have values selected from a range of values having a resolution of greater than one byte (e.g., two bytes, four bytes, etc.) to reduce the synthesized code size and hardware area even further, or less than one byte (e.g., one bit, two bits, four bits, etc.).

At block 530, a transaction is detected in which a new portion of the packet header is received (via an input interface having the interface width W). In one embodiment, for example, a transaction is detected based on a change in the state of a signal indicating the arrival of a new header portion, such as the data transaction signal 352 of FIG. 4.

At block 540, a counter value is incremented in response to the detection of the transaction, corresponding to a new packet header portion, at block 530.

At block 550, it is determined whether the counter value has reached a threshold value corresponding to the transaction number N that was specified at block 520. In one embodiment, the threshold value is equal to the transaction number N specified at block 520, and the counter value is incremented by one at block 540.

If it is determined at block 550 that the counter value has not reached the threshold value, flow proceeds back to block 530, and remains at block 530 until the next transaction in which a new header portion is received is detected. Conversely, if it is determined at block 550 that the counter value has reached the threshold value, flow proceeds to block 560.

At block 560, in response to detecting the Nth transaction (i.e., detecting that the counter value has reached the threshold value), the target field of the packet header is processed using the local offset L specified at block 520. In some embodiments, the target field is processed by modifying and/or parsing the target field using the local offset L. In various embodiments and/or scenarios, for example, the target field is modified at block 560 by multiplexing the header portion along with a new value of the target field, and/or by parsing the target field by multiplexing the header portion alone. In one such embodiment, the method 500 includes an additional block in which one or more control signals are generated based on the local offset L, and the target field is processed at block 560 at least in part by multiplexing the target field according to the generated control signal(s).

In some embodiments, the method 500 includes other additional blocks not seen in FIG. 6. In some embodiments, for example, the method 500 detects a beginning of the packet header (e.g., before, or in conjunction with, the first iteration of the block 530, with the detection being based on a signal similar to the start of packet signal 344 in FIG. 4). In one such embodiment, the counter value is reset, prior to the first iteration of block 540, in response to the detection of the beginning of the packet header. In one embodiment where the transaction corresponding to the initial portion of a packet header is labeled transaction number zero (such that transaction number N corresponds to the (N+1)th transaction), and where the threshold value is set to N, the counter is reset to zero when the new packet header is detected, and the counter value is incremented by one at block 540. Moreover, in some embodiments, the method 500 includes an additional block in which the packet header portion is simply "passed through" to an output (i.e., not modified) when it is determined at block 550 that the counter value has not reached the threshold value, before returning to block 530. In one such embodiment, the method 500 also includes an additional block or blocks in which header portions received after the target transaction are similarly passed through without modification.

In some embodiments, at least portions of the packet processing techniques described above are implemented in hardware or firmware. For example, the input interface 12, field processing module 14, state machine module 20, and output interface 16 of FIG. 1, or the data out MUX 302, assembly MUX 304, and state machine module 306 of FIG. 4, are, in whole or in part, implemented by digital hardware, in various embodiments. In some of these embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic arrays (PLA), etc. In an alternative embodiment, the state machine module 20 of FIG. 1, or the state machine module 306 of FIG. 4, is, in whole or in part, implemented by software.

Embodiments of the present disclosure may be embodied in any suitable type of network device used in a wired or wireless communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of processing a packet header received, the method comprising:
   receiving, at an input interface of a processing unit within a network device, a plurality of data units that collectively correspond to a header of a network packet, including receiving a first data unit that includes an initial portion of the header, wherein a width of the input interface is smaller than a width of the header;
   specifying, at the processing unit, a location of a target field of the header in one or more data units among the plurality of data units, wherein the target field is contained in one or more data units other than the first data unit;
   identifying the one or more data units containing the target field among the plurality of data units; and
   processing, at the processing unit, the target field using a local offset corresponding to the specified location of the target field relative to a beginning location of an initial data unit of the identified one or more data units, wherein the local offset is determined based on (i) a global offset corresponding to a location of the target field relative to a beginning of the initial portion of the header and (ii) a number of bits in one or more data units that precede the one or more data units that contain the target field.

2. A method according to claim 1, wherein receiving the plurality of data units includes receiving a different data unit of the plurality of data units in each transaction of a plurality of transactions.

3. A method according to claim 2, wherein processing the target field using the local offset includes processing the target field using an expected starting location of the target field relative to the initial data unit of the one or more data units containing the target field.

4. A method according to claim 3, wherein specifying the location of the target field in the one or more data units among the plurality of data units includes:
specifying a transaction number, wherein the transaction number corresponds to a target transaction, of the plurality of transactions, in which the initial data unit of the one or more data units is expected to be received; and
specifying the local offset.

5. A method according to claim 4, wherein identifying the one or more data units containing the target field among the plurality of data units includes identifying the one or more data units containing the target field among the plurality of data units based on the specified transaction number.

6. A method according to claim 5, wherein identifying the one or more data units containing the target field among the plurality of data units based on the specified transaction number includes:
detecting each transaction of the plurality of transactions;
incrementing a counter value in response to detecting each transaction of the plurality of transactions; and
detecting when the counter value reaches a threshold value corresponding to the specified transaction number.

7. A method according to claim 2, further comprising receiving, at the processing unit, information indicating the global offset, wherein:
specifying the location of the target field in the one or more data units among the plurality of data units includes
specifying a transaction number, wherein the transaction number corresponds to a target transaction, of the plurality of transactions, in which the initial data unit of the one or more data units is expected to be received, and
specifying the local offset;
specifying the transaction number includes specifying the transaction number based on i) the global offset and ii) the width of the input interface; and
specifying the local offset includes specifying the local offset based on i) the global offset and ii) the width of the input interface.

8. A method according to claim 7, further comprising determining, at the processing unit and based on i) the global offset, ii) the width of the input interface, and iii) an expected size of the target field, a total number of data units in the one or more data units containing the target field.

9. A method according to claim 8, wherein:
processing the target field using the local offset includes parsing the target field using the local offset;
determining the total number of data units in the one or more data units containing the target field includes determining that the total number of data units is at least two;
the method further comprises:
storing, at the processing unit, a first parsed portion of the target field in a buffer during a first clock cycle, wherein the first parsed portion of the target field is extracted from the initial data unit of the one or more data units, and
storing, at the processing unit, a second parsed portion of the target field in a buffer during a second clock cycle, wherein the second parsed portion of the target field is extracted from a subsequent data unit of the one or more data units; and
processing the target field using the local offset includes, after storing the first parsed portion of the target field in a buffer and storing the second parsed portion of the target field in a buffer, concatenating the stored first parsed portion of the target field with the stored second parsed portion of the target field.

10. A method according to claim 1, wherein processing the target field using the local offset includes one or both of i) modifying the target field using the local offset and ii) parsing the target field using the local offset.

11. A method according to claim 10, wherein processing the target field using the local offset includes:
generating one or more control signals based on the local offset; and
multiplexing the one or more data units containing the target field according to the one or more control signals.

12. A method according to claim 11, wherein processing the target field using the local offset includes modifying the target field using the local offset, and wherein multiplexing the one or more data units containing the target field includes multiplexing i) the one or more data units containing the target field and ii) a new value of the target field.

13. An apparatus, comprising:
an input interface configured to receive a plurality of data units that collectively correspond to a header of a network packet, wherein a width of the input interface is smaller than a width of the header;
a state machine module configured to
specify a location of a target field of the header in one or more data units among the plurality of data units, wherein the target field is contained in one or more data units other than a first data unit, wherein the first data unit includes an initial portion of the header, and
identify the one or more data units containing the target field among the plurality of data units; and
a field processing module having one or more inputs coupled to the input interface, wherein the field processing module is configured to
process the target field using a local offset corresponding to the specified location of the target field relative to a beginning location of an initial data unit of the identified one or more data units, wherein the local offset is determined based on (i) a global offset corresponding to a location of the target field relative to a beginning of the initial portion of the header and (ii) a number of bits in one or more data units that precede the one or more data units that contain the target field.

14. An apparatus according to claim 13, wherein the input interface is configured to receive a different data unit of the plurality of data units in each transaction of a plurality of transactions.

15. An apparatus according to claim 14, wherein the field processing module is configured to process the target field using the local offset at least in part by processing the target field using an expected starting location of the target field relative to the initial data unit of the one or more data units containing the target field.

16. An apparatus according to claim 15, wherein the state machine module is configured to specify the location of the target field in the one or more data units among the plurality of data units at least in part by:
specifying a transaction number, wherein the transaction number corresponds to a target transaction, of the plurality of transactions, in which the initial data unit of the one or more data units is expected to be received; and
specifying the local offset.

17. An apparatus according to claim 16, wherein:
the state machine module includes a counter; and
the state machine module is configured to identify the one or more data units containing the target field among the plurality of data units at least in part by detecting each transaction of the plurality of transactions, incrementing a value of the counter in response to detecting each transaction of the plurality of transactions, and detecting when the value of the counter reaches a threshold value corresponding to the specified transaction number.

18. An apparatus according to claim 16, wherein:

the state machine module is further configured to receive information indicating the global offset;

the state machine module is configured to specify the transaction number based on i) the global offset and ii) the width of the input interface; and the state machine module is configured to specify the local offset based on i) the global offset and ii) the width of the input interface.

19. An apparatus according to claim 18, wherein the state machine module is further configured to determine, based on i) the global offset, ii) the width of the input interface, and iii) an expected size of the target field, a total number of data units in the one or more data units containing the target field.

20. An apparatus according to claim 16, wherein the state machine module is configured to identify the one or more data units containing the target field among the plurality of data units at least in part by identifying the one or more data units containing the target field among the plurality of data units based on the specified transaction number.

21. An apparatus according to claim 13, wherein the field processing module is configured to process the target field using the local offset at least in part by one or both of i) modifying the target field using the local offset and ii) parsing the target field using the local offset.

22. An apparatus according to claim 21, wherein:

the field processing module includes one or more multiplexors; and the state machine module is further configured to generate one or more control signals based on the local offset; and the field processing module is configured to process the target field according to the one or more control signals using the one or more multiplexors.

23. An apparatus according to claim 13, wherein the input interface, the field processing module, and the state machine module are implemented on an integrated circuit.

\* \* \* \* \*